(12) United States Patent
Coutu

(10) Patent No.: US 11,814,969 B2
(45) Date of Patent: Nov. 14, 2023

(54) GAS TURBINE ENGINE WITH LOW-PRESSURE COMPRESSOR BYPASS

(71) Applicant: PRATT & WHITNEY CANADA CORP., Longueuil (CA)

(72) Inventor: Daniel Coutu, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/381,446

(22) Filed: Jul. 21, 2021

(65) Prior Publication Data

US 2023/0024094 A1    Jan. 26, 2023

(51) Int. Cl.

| | |
|---|---|
| *F02C 9/18* | (2006.01) |
| *F01D 17/14* | (2006.01) |
| *F01D 17/16* | (2006.01) |
| *F02C 6/02* | (2006.01) |
| *F02C 9/22* | (2006.01) |

(52) U.S. Cl.
CPC ......... *F01D 17/145* (2013.01); *F01D 17/162* (2013.01); *F02C 6/02* (2013.01); *F02C 9/18* (2013.01); *F02C 9/22* (2013.01); *F05D 2220/323* (2013.01); *F05D 2260/606* (2013.01); *F05D 2270/053* (2013.01); *F05D 2270/335* (2013.01)

(58) Field of Classification Search
CPC .......... F01D 17/162; F01D 17/14; F02C 6/08; F02C 9/18; F02C 7/042; F02C 7/04; F02C 7/277
See application file for complete search history.

(56) References Cited

U.S. PATENT DOCUMENTS

| | | | |
|---|---|---|---|
| 1,688,736 A | 10/1928 | Moody | |
| 2,529,973 A | 11/1950 | Sedille et al. | |
| 5,775,092 A | 7/1998 | Hines | |
| 9,957,969 B2 | 5/2018 | Krausche et al. | |
| 10,060,278 B2 | 8/2018 | Boeck | |
| 10,316,759 B2 * | 6/2019 | Kulkarni | F01N 3/30 |
| 10,767,562 B2 * | 9/2020 | Liu | F04D 29/522 |
| 10,975,775 B2 * | 4/2021 | Kimura | F02K 3/06 |
| 11,208,950 B2 * | 12/2021 | Wehmeier | F02C 9/20 |
| 11,236,630 B2 * | 2/2022 | Hosaka | F01D 17/162 |
| 2010/0154435 A1 | 6/2010 | Exley et al. | |

(Continued)

*Primary Examiner* — Thuyhang N Nguyen
(74) *Attorney, Agent, or Firm* — Norton Rose Fulbright Canada LLP

(57) ABSTRACT

An aircraft engine, has: a low-pressure compressor and a high-pressure compressor located downstream of the low-pressure compressor; a gaspath valve upstream of the high-pressure compressor, the gaspath valve movable between an open configuration and a closed configuration; and a bypass flow path having in flow series a bypass inlet, a bypass valve, and a bypass outlet, the bypass inlet fluidly communicating with the gaspath upstream of at least one stage of the low-pressure compressor, the bypass valve having an open configuration in which the bypass valve allows a bypass flow and a closed configuration in which the bypass valve blocks the bypass flow, the bypass outlet fluidly communicating with the bypass inlet via the bypass valve and with the gaspath at a location in the gaspath fluidly downstream of the gaspath valve, downstream of the low-pressure compressor, and upstream of the high-pressure compressor.

19 Claims, 6 Drawing Sheets

(56) References Cited

U.S. PATENT DOCUMENTS

| | | | |
|---|---|---|---|
| 2010/0326085 A1* | 12/2010 | Veilleux | F01D 1/06 |
| | | | 60/778 |
| 2017/0284304 A1* | 10/2017 | Nestico | F02C 3/13 |
| 2020/0049025 A1 | 2/2020 | Morgan et al. | |
| 2020/0116041 A1 | 4/2020 | Plante et al. | |

* cited by examiner

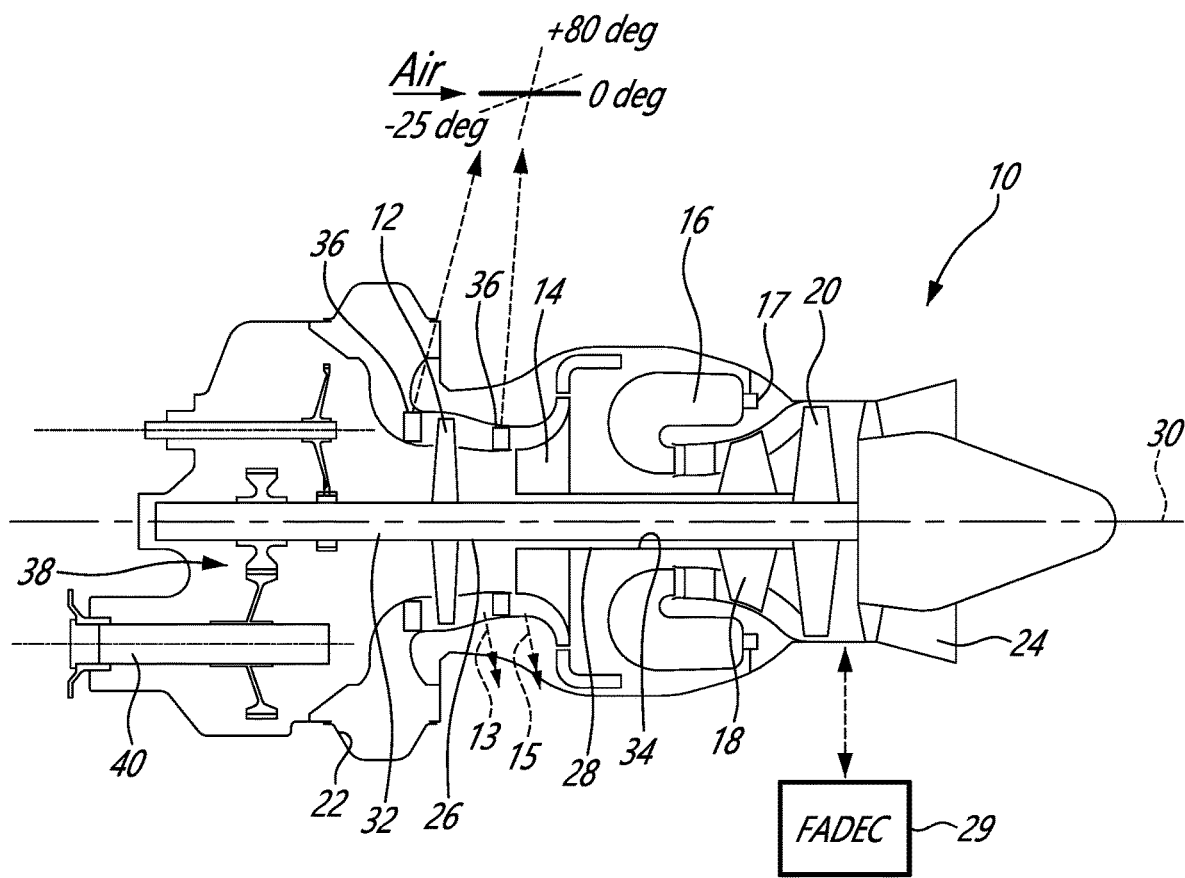

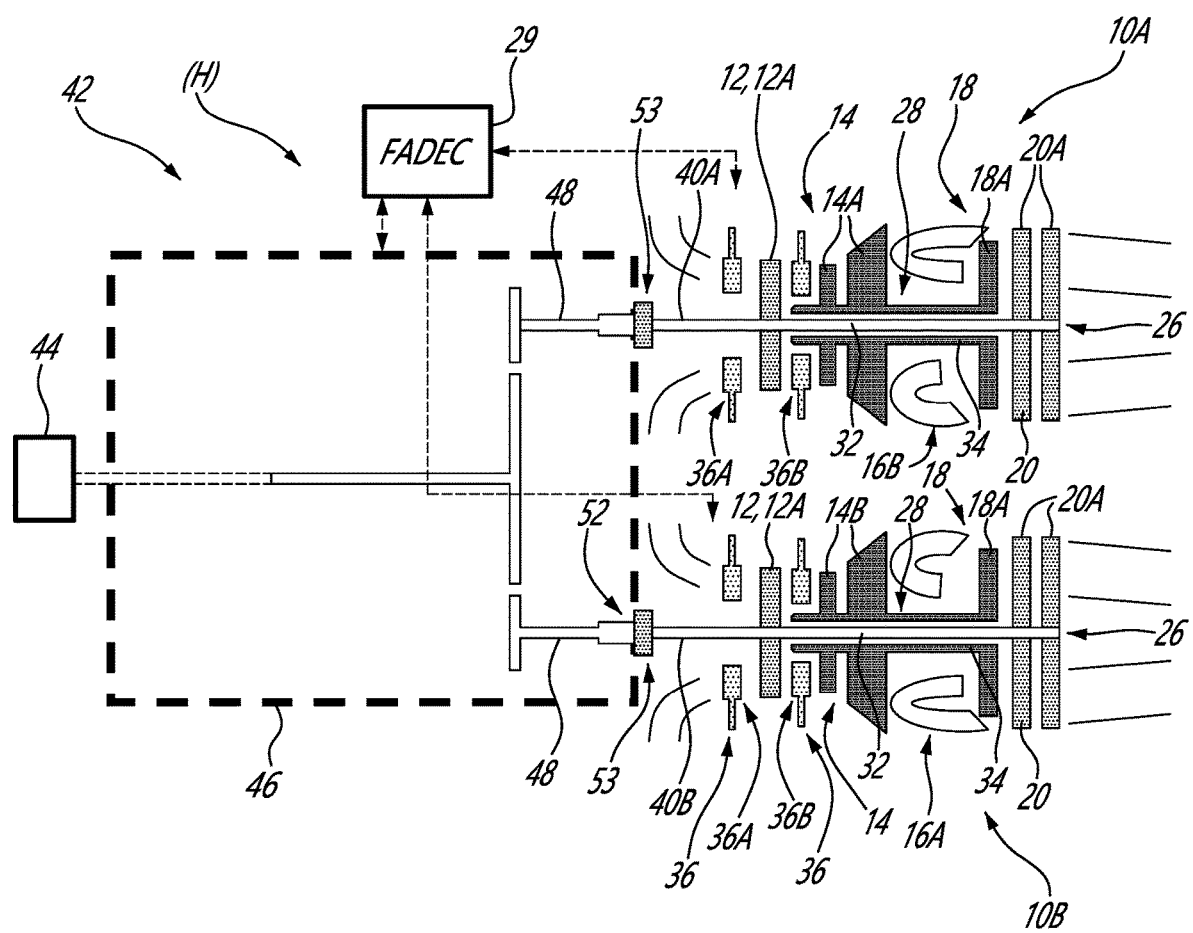
FIG_2

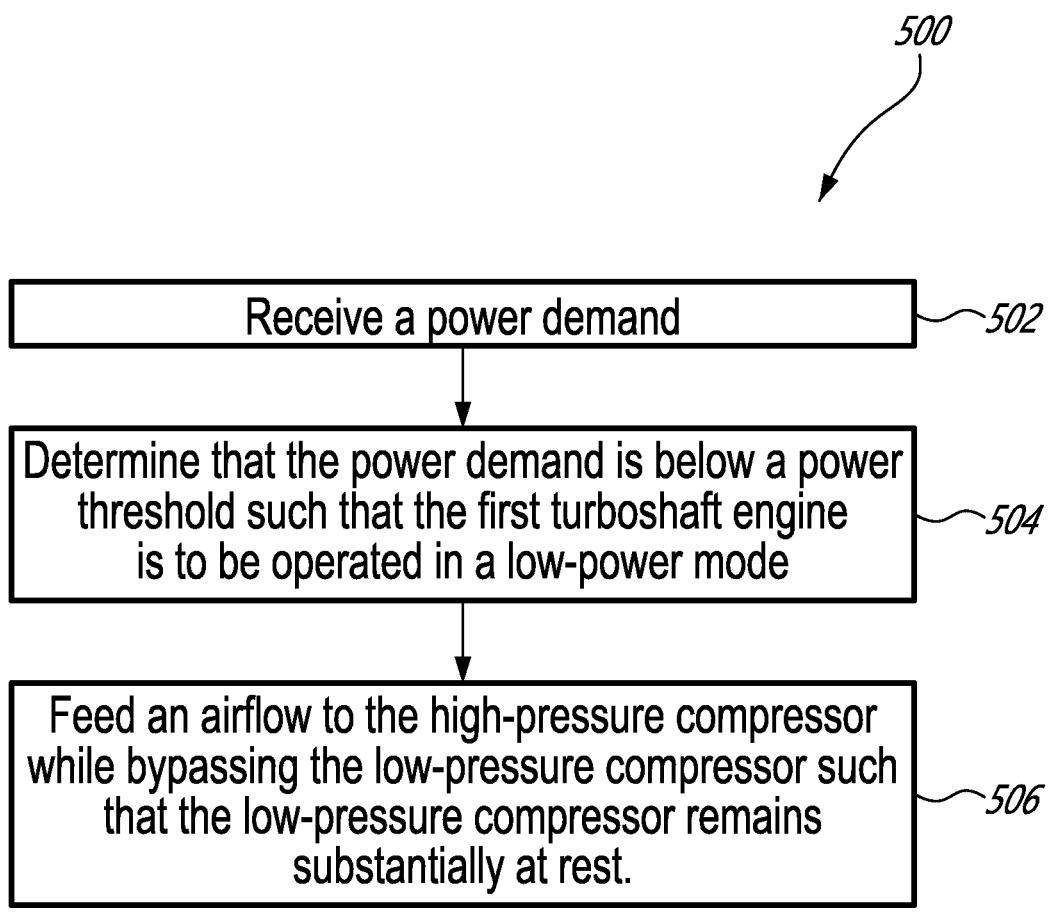

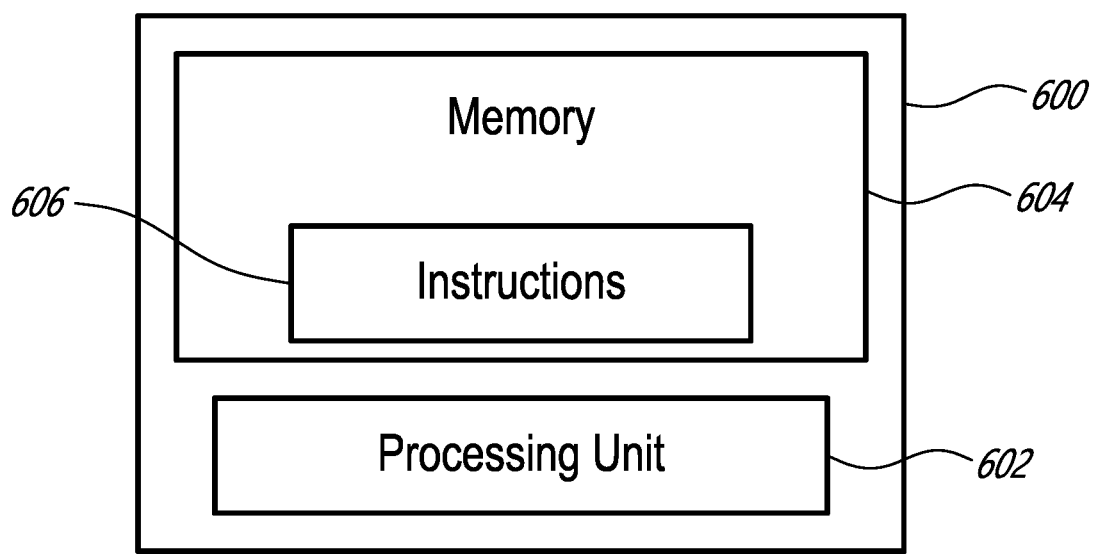

GAS TURBINE ENGINE WITH LOW-PRESSURE COMPRESSOR BYPASS

TECHNICAL FIELD

The disclosure relates generally to multi-engine systems for aircraft and methods of controlling such systems.

BACKGROUND

Multi-engine helicopters are often provided with two or more gas turbine turboshaft engines connected to a main rotor via a common gearbox, and each of the engines is sized to provide power greater than what is required for cruising using both/all engines. During normal cruise operating regimes, both engines typically operate at similar power output levels (e.g. each engine provides 50% of the total power output). Attempts have however been made to operate the engines asymmetrically, that is, operating one engine at a higher power than the other. Doing so can provide overall better fuel efficiency in some situations. However, the engine operating at lower power needs to be able to rapidly speed back up, when called upon. While such systems are suitable for their intended purposes, improvements are desirable.

SUMMARY

In one aspect, there is provided an aircraft engine, comprising: a low-pressure compressor and a high-pressure compressor located fluidly downstream of the low-pressure compressor relative to a gaspath extending through the aircraft engine; a gaspath valve at a location in the gaspath fluidly upstream of the high-pressure compressor, the gaspath valve movable between an open configuration in which the gaspath valve allows a gas flow through the gaspath, and a closed configuration in which the gaspath valve blocks the gas flow through the gaspath; and a bypass flow path having in flow series a bypass inlet, a bypass valve, and a bypass outlet, the bypass inlet fluidly communicating with the gaspath at a location in the gaspath fluidly upstream of at least one stage of the low-pressure compressor, the bypass valve having an open configuration in which the bypass valve allows a bypass flow through the bypass flow path and a closed configuration in which the bypass valve blocks the bypass flow through the bypass flow path, the bypass outlet fluidly communicating with the bypass inlet via the bypass valve and with the gaspath at a location in the gaspath fluidly downstream of the gaspath valve, downstream of the low-pressure compressor, and upstream of the high-pressure compressor to flow the gas flow to the high-pressure compressor while bypassing the at least one stage of the low-pressure compressor such that the at least one stage of the low-pressure compressor is substantially non-rotating.

The aircraft engine as described above may include any of the following features, in whole or in part, and in any combination.

In some embodiments, the gaspath valve is variable guide vanes extending across the gaspath and being pivotable about respective spanwise axes between an open position and a closed position.

In some embodiments, the bypass inlet is an inlet port defined through a wall delimiting the gaspath, the bypass outlet being an outlet port defined through the wall delimiting the gaspath.

In some embodiments, the bypass flow path is one or both of annular and concentric with the gaspath, and located radially outwardly of the gaspath.

In some embodiments, the aircraft engine includes a gas turbine engine.

In some embodiments, the bypass valve includes a plurality of pivotable gates extending across the bypass flow path.

In some embodiments, the bypass inlet is independent from an inlet of the gaspath.

In some embodiments, the gaspath valve is located in the gaspath at a location that is one of: upstream and downstream of the low-pressure compressor.

In another aspect, there is provided a multi-engine system for a rotorcraft, comprising: a first turboshaft engine and a second turboshaft engine for driving a common rotatable load, the first turboshaft engine having: a low-pressure compressor and a high-pressure compressor fluidly downstream of the low-pressure compressor relative to a gaspath extending through the first turboshaft engine, a gaspath valve at a location in the gaspath fluidly upstream of the high-pressure compressor, the gaspath valve movable between an open configuration in which the gaspath valve allows a gas flow through the gaspath, and a closed configuration in which the gaspath valve blocks the gas flow through the gaspath, a bypass flow path having in flow series a bypass inlet, a bypass valve, and a bypass outlet, the bypass inlet fluidly communicating with the gaspath at a location in the gaspath fluidly upstream of at least one stage of the low-pressure compressor, the bypass valve having an open configuration in which the bypass valve allows a bypass flow through the bypass flow path independently of the low-pressure compressor, and a closed configuration in which the bypass valve blocks the bypass flow through the bypass flow path, the bypass outlet fluidly communicating with the bypass inlet via the bypass valve and with the gaspath at a location in the gaspath fluidly downstream of the gaspath valve, downstream of the low-pressure compressor, and upstream of the high-pressure compressor to flow the gas flow to the high-pressure compressor while bypassing the at least one stage of the low-pressure compressor such that the at least one stage of the low-pressure compressor is substantially non-rotating.

The multi-engine system as described above may include any of the following features, in whole or in part, and in any combination.

In some embodiments, a controller has a processing unit and a computer-readable medium having instructions stored thereon executable by the processing unit for: receiving a power demand; determining that the power demand is below a power threshold such that the first turboshaft engine is to be operated in a low-power mode; and closing the gaspath valve and opening the bypass valve such that the gas flow flows in the high-pressure compressor while bypassing the low-pressure compressor.

In some embodiments, the gaspath valve is variable guide vanes extending across the gaspath and being pivotable about respective spanwise axes between an open position and a closed position.

In some embodiments, the bypass inlet of the bypass flow path is an inlet port defined through a wall delimiting the gaspath, the bypass outlet of the bypass flow path being an outlet port defined through the wall delimiting the gaspath.

In some embodiments, the bypass flow path is one or both of annular and concentric with the gaspath.

In some embodiments, the bypass flow path is located radially outwardly of the gaspath.

In some embodiments, the bypass valve includes a plurality of pivotable gates extending across the bypass flow path.

In some embodiments, the bypass inlet of the bypass flow path is independent from an inlet of the gaspath.

In some embodiments, the gaspath valve is located in the gaspath at a location that is one of: upstream or downstream of the low-pressure compressor.

In another aspect, there is provided a method of operating a multi-engine system of a rotorcraft, the multi-engine system having a first turboshaft engine and a second turboshaft engine, the first turboshaft engine having a low-pressure compressor and a high-pressure compressor, the method comprising: receiving a power demand; determining that the power demand is below a power threshold such that the first turboshaft engine is to be operated in a low-power mode; and feeding an air flow to the high-pressure compressor of the first turboshaft engine while bypassing the low-pressure compressor thereof such that the low-pressure compressor remains substantially at rest during operation of the first turboshaft engine in the low-power mode.

The method described above may include any of the following features in any combinations.

In some embodiments, the feeding of the air flow includes flowing the air flow into a bypass flow path bypassing the low-pressure compressor.

In some embodiments, the method includes receiving a second power demand above a second power threshold and flow the air flow through both of the low-pressure compressor and the high-pressure compressor.

BRIEF DESCRIPTION OF THE DRAWINGS

Reference is now made to the accompanying figures in which:

FIG. 1 is a schematic cross sectional view of a gas turbine engine depicted as a turboshaft engine;

FIG. 2 is a schematic representation of an exemplary multi-engine system, showing two of the FIG. 1 engines;

FIG. 5 is a flow chart illustrating steps of operating the gas turbine engine of FIG. 1; and FIG. 6 is a schematic representation of a computing device in accordance with one embodiment.

DETAILED DESCRIPTION

Figure 3A:
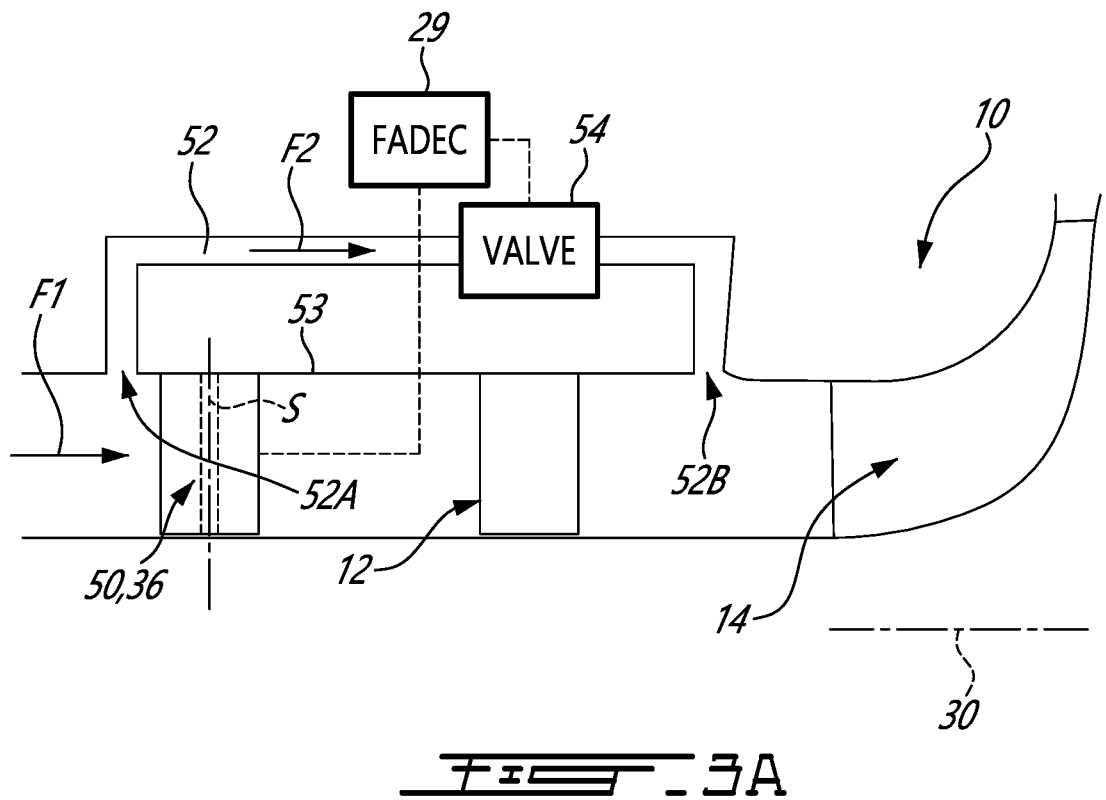
FIG. 3A is a schematic three dimensional view of a portion of the gas turbine engine of FIG. 1 showing a first exemplary implementation of a bypass around a low-pressure compressor of the engine of FIG. 1 in accordance with a first variant.

FIG. 1 illustrates an aircraft engine. In this example, the aircraft engine is a turboshaft gas turbine engine 10 generally comprising in serial flow communication a low pressure (LP) compressor section, which will be referred below as the LP compressor 12 and a high pressure (HP) compressor section, which will be referred below as the HP compressor 14 for pressurizing air received via an air inlet 22. The air compressed by the LP compressor 12 and by the HP compressor 14 is fed to a combustor 16 in which the compressed air is mixed with a fuel flow, delivered to the combustor 16 via fuel nozzles 17 from fuel system (not depicted), and ignited for generating a stream of hot combustion gases. A high pressure turbine section, which will referred to below as the HP turbine 18, extracts energy from the combustion gases. A low pressure turbine section, which will be referred to below as the LP turbine 20 is located downstream of the HP turbine 18 for further extracting energy from the combustion gases and driving the LP compressor 12. The combustion gases are then exhausted by an exhaust outlet 24. It is to be understood that the gas turbine engine 10 may also be an electric or hybrid-electric engine, with one or more of the rotors and/or spools of the engine driven electrically. For the sake of simplicity, such engines will still be referred to herein as "gas turbine engines".

In the embodiment shown, the gas turbine engine 10 includes a low-pressure spool, referred to below as LP spool 26, and a high-pressure spool, referred to below as a HP spool 28. The LP spool 26 includes a low-pressure shaft, referred to below as LP shaft 32. The HP spool 28 includes a high-pressure shaft, referred to below as HP shaft 34. The HP turbine 18 is drivingly engaged to the HP compressor 14 via the HP shaft 34. The LP turbine 20 is drivingly engaged to the LP compressor 12 via the LP shaft 32. The HP spool 28, and the components mounted thereon, are configured to rotate independently from the LP spool 26 and from the components mounted thereon. These two spools may thus rotate at different speeds about an engine central axis 30. The HP shaft 34 and the LP shaft 32 may be concentric. In the embodiment shown, the HP shaft 34 extends around the LP shaft 32. The term "spool" is herein intended to broadly refer to drivingly connected turbine and compressor rotors, and need not mean the simple shaft arrangements depicted.

In the embodiment shown, the HP compressor 14 rotates at the same speed as the HP turbine 18. And, the LP compressor 12 rotates at the same speed as the LP turbine 20. However, this may not be the case if transmission(s) are provided on the LP spool 26 and HP spool 28 to create speed ratios between the interconnected compressors and turbines. This may increase or decrease rotational speeds of the compressors relative to that of the turbines. Any suitable transmissions may be used for this purpose.

The LP compressor section 12 may include one or more compression stages, and the HP compressor section 14 may include one or more compression stages. In the embodiment shown in FIG. 1, the LP compressor 12 includes a single compressor stage 12A (FIG. 2), which may include a single mixed flow rotor (MFR), for example such as described in U.S. Pat. No. 6,488,469 B1, entitled "MIXED FLOW AND CENTRIFUGAL COMPRESSOR FOR GAS TURBINE ENGINE", the contents of which are hereby expressly incorporated herein by reference in its entirety.

The turboshaft engine 10 may include a transmission 38 driven by the low pressure shaft 32 and driving a rotatable output shaft 40. The transmission 38 may optionally be provided to vary a ratio between rotational speeds of the low pressure shaft 32 and the output shaft 40.

The LP compressor 12 and the HP compressor 14 are configured to deliver desired respective pressure ratios in use, as will be described further below. The LP compressor 12 may have a bleed valve 13 (shown schematically) which may be configured to selectively bleed air from the LP compressor 12 according to a desired control regime of the engine 10, for example to assist in control of compressor stability. The design of such valve 13 is well known and not described herein in further detail. Any suitable bleed valve arrangement may be used.

As mentioned, the HP compressor 14 is configured to independently rotate from the LP compressor 12 by virtue of their mounting on different engine spools. The HP compressor 14 may include one or more compression stages, such as a single stage, or two or more stages 14A as shown in more detail in FIG. 2. It is contemplated that the HP compressor 14 may include any suitable type and/or configuration of stages. The HP compressor 14 is configured to deliver a desired pressure ratio in use, as will be described further below. The HP compressor 14 may have a bleed valve 15 (shown schematically) which may be configured to selectively bleed air from the HP compressor 14 according to a desired control regime of the engine 10, for example to assist in control of compressor stability. The design of such valve 15 is well known and not described herein in further detail. Any suitable bleed valve arrangement may be used.

In use, suitable one or more controllers 29, such as one or more full authority digital controllers (FADEC) providing full authority digital control of the various relevant parts of the engine 10, controls operation of the engine 10. The FADEC(s) may be provided as for example conventional software and/or hardware, so long as the FADEC(s) is/are configured to perform the various control methods and sequences as described in this document. Each controller 29 may be used to control one or more engines 10 of an aircraft (H). Additionally, in some embodiments the controller(s) 29 may be configured for controlling operation of other elements of the aircraft (H), for instance the main rotor 44.

Referring to FIGS. 1-2, the turboshaft engine 10 may include variable guide vanes (VGVs) 36. As seen in FIG. 2, at least a first set of VGVs 36A is located upstream of the LP compressor 12. A second set of VGVs 36B may optionally also be provided, and if present is located upstream of the HP compressor 14. The VGVs 36 may be independently controlled by suitable one or more controllers 29, as described above. The VGVs 36 may direct inlet air to the corresponding stage of the LP compressor 12 and of the HP compressor 14. The VGVs 36 may be operated to modulate the inlet air flow to the compressors in a manner which may allow for improved control of the output power of the turboshaft engine 10, as described in more detail below. The VGVs 36 may be provided with any suitable operating range. In some embodiments, VGVs 36 may be configured to be positioned and/or modulated between about +80 degrees and about −25 degrees, with 0 degrees being defined as aligned with the inlet air flow, as depicted schematically in FIG. 1. In a more specific embodiment, the VGVs 36 may rotate in a range from +78.5 degrees to −25 degrees, or from +75 degrees to −20 degrees, and more particularly still from 70 degrees to −20 degrees. The two set of VGVs 36 may be configured for a similar range of positions, or other suitable position range.

In some embodiments, the first set of VGVs 36A upstream of the LP compressor 12 may be mechanically decoupled from the second set of VGVs 36B upstream of the HP compressor 14 and downstream of the LP compressor 12, having no mechanical link between the two sets of VGVs to permit independent operation of the respective stages. The VGVs 36 may be operatively controlled by the controller(s) 29 described above, to be operated independently of each other. Indeed, the turboshaft engine 10 is also controlled using controller(s) 29 described above, to carry out the methods described in this document. For the purposes of this document, the term "independently" in respects of the VGVs 36 means that the position of one set of the VGV vanes (e.g. 36A) may be set without effecting any change to a position of the other set of the VGV vanes (e.g. 36B), and vice versa.

Independent control of the VGVs 36 may allow the spools 26, 28 to be operated to reduce or eliminate or reduce aerodynamic coupling between the spools 26, 28. This may permit the spools 26, 28 to be operated at a wider range of speeds than may otherwise be possible. The independent control of the VGVs 36 may allow the spools 26, 28 to be operated at constant speed over a wider operating range, such as from a "standby" speed to a "cruise" power speed, or a higher speed. In some embodiments, independent control of the VGVs 36 may allow the spools 26, 28 to run at speeds close to maximum power. In some embodiments, independent control of the VGVs 36 may also allow one of the spools 26, 28 to run at high speed while the other one run at low speed.

In use, the turboshaft engine 10 is operated by the controller(s) 29 described above to introduce a fuel flow via the nozzles 17 to the combustor 16. Combustion gases turn the HP turbine 18, 18A, 18B and the LP turbine 20, 20A, 20B which in turn drive the HP compressor 14, 14A, 14B and the LP compressor 12, 12A, 12B. The controller(s) 29 control(s) the angular position of VGVs 36 in accordance with a desired control regime, as will be described further below. The speed of the engine 10 is controlled, at least in part, by the delivery of a desired fuel flow rate to the engine, with a lower fuel flow rate (e.g., a rate of change of a fuel flow) causing the turboshaft engine 10 to operate at a lower output speed than a higher fuel flow rate.

Such control strategies may allow for a faster "power recovery" of the turboshaft engine 10 such as when an engine is accelerated from a low output speed to a high output speed, possibly because the spools 26, 28 may be affected relatively less by their inherent inertia through the described use of spool 26, 28 speed control using VGVs 36, as will be further described below. In some embodiments, using the VGVs 36 as described herein, in combination with the use of the LP compressor 12, which may be MFR based, and of the HP compressor 14, which may be MFR based, may provide relatively more air and/or flow control authority and range through the core of the engine 10, and/or quicker power recovery.

Where MFR compressors of the turboshaft engine 10 are provided as described herein, the control of the VGVs 36 may provide for improved stability of engine operation. This may be so even where the VGVs 36 is operated at an extreme end of their ranges, such as in the "closed down" position (e.g. at a position of +80 degrees in one embodiment described herein). This control of the VGVs 36 may facilitate the ability of the turboshaft engine 10 to operate at a very low power setting, such as may be associated with a "standby" mode as described further below herein, wherein the compressor of an engine operating in standby mode is operating in a very low flow and/or low pressure ratio regime.

Turning now to FIG. 2, illustrated is an exemplary multi-engine system 42 that may be used as a power plant for an aircraft, including but not limited to a rotorcraft such as a helicopter (H). The multi-engine system 42 may include two or more engines 10A, 10B. The two engines 10A, 10B may drive a common load via a reduction gearbox 46 and an output shaft 50. Clutches 52, 53 may be used to selectively engage and disengage output shafts 48, 40A, 40B of the engines 10A, 10B to the reduction gearbox 46. In the case of a helicopter application, these engines 10A, 10B will be turboshaft engines such as the turboshaft engine 10 described above with reference to FIG. 1. They may alternatively be any suitable gas turbine engines. Control of the multi-engine system 42 is effected by one or more controller(s) 29, which may be FADEC(s), electronic engine controller(s) (EEC(s)), or the like, that are programmed to manage, as described herein below, the operation of the engines 10A, 10B to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 42. Other phases of a typical helicopter mission would include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions, such as cruise speed and altitude, are substantially stable, the engines 10A, 10B of the system 42 may be operated asymmetrically, with one engine operated in a high-power "active" mode and the other engine operated in a lower-power "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime", wherein one of the two engines is operated in a low-power "standby mode" while the other engine is operated in a high-power "active" mode. In such an asymmetric operation, which may be engaged during a cruise phase of flight (continuous, steady-state flight which is typically at a given commanded constant aircraft cruising speed and altitude). The multi-engine system 42 may be used in an aircraft, such as a helicopter, but also has applications in suitable marine and/or industrial applications or other ground operations.

Referring still to FIG. 2, according to the present description the multi-engine system 42 driving a helicopter (H) may be operated in this asymmetric manner, in which a first of the turboshaft engines (say, 10A) may be operated at high power in an active mode and the second of the turboshaft engines, for instance the engine 10B in this example, may be operated in a low-power standby mode. This asymmetric operation mode may also be referred to as an "Idle Cruise Regime" (ICR). In one example, the first turboshaft engine 10A may be controlled by the controller(s) 29 to run at full (or near-full) power conditions in the active mode, to supply substantially all or all of a required power and/or speed demand of the common load 44. The second turboshaft engine 10B may be controlled by the controller(s) 29 to operate at low-power or no-output-power conditions to supply substantially none or none of a required power and/or speed demand of the common load 44. Optionally, a clutch may be provided to declutch the low-power engine. Controller(s) 29 may control the engine's governing on power according to an appropriate schedule or control regime. The controller(s) 29 may comprise a first controller for controlling the first engine 10A and a second controller for controlling the second engine 10B. The first controller and the second controller may be in communication with each other in order to implement the operations described herein. In some embodiments, a single controller 29 may be used for controlling the first engine 10A and the second engine 10B. The term controller as used herein includes any one of: a single controller controlling the engines, and any suitable combination of multiple controllers controlling the engines, including one or more controllers for each engine, so long as the functionality described in this document is provided.

In another example, an asymmetric operating regime of the engines may be achieved through the one or more controller's 29 differential control of fuel flow to the engines, as described in U.S. patent application Ser. No. 16/535,256 filed Aug. 8, 2019, the entire contents of which are incorporated herein by reference. Low fuel flow may also include zero fuel flow in some examples.

Although various differential control between the engines of the engine system 42 are possible, in one particular embodiment the controller(s)29 may correspondingly control fuel flow rate to each engine 10A, 10B accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the asymmetric mode, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 29 may operate one engine, for instance the engine 10B, of the multiengine system 42 in a standby mode at a power substantially lower than a rated cruise power level of the engine, and in some embodiments at zero output power and in other embodiments less than 10% output power relative to a reference power (provided at a reference fuel flow). Alternately still, in some embodiments, the controller(s) 29 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 42 of FIG. 2 may be operated in an asymmetric operating regime by control of the relative speed of the engines using controller(s) 29, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

Although the examples described herein illustrate two engines, asymmetric mode is applicable to more than two engines, whereby at least one of the multiple engines is operated in a low-power standby mode while the remaining engines are operated in the active mode to supply all or substantially all of a required power and/or speed demand of a common load.

In use, the first turboshaft engine (say 10A) may operate in the active mode while the other turboshaft engine, such as the engine 10B, may operate in the standby mode, as described above. During this asymmetric operation, if the helicopter (H) needs a power increase (expected or otherwise), the second turboshaft engine 10B may be required to provide more power relative to the low power conditions of the standby mode, and possibly return immediately to a high- or full-power condition. This may occur, for example, in an emergency condition of the multi-engine system 42 powering the helicopter, wherein the "active" engine loses power the power recovery from the lower power to the high power may take some time. Even absent an emergency, it will be desirable to repower the standby engine to exit the asymmetric mode.

However, when one of the engines 10A, 10B is operated at low engine power (e.g., sub-idle) where limited air is flowing therethrough, the LP compressor 12 spins without doing any work. This may be referred to as a wind milling effect. This may cause parasitic drag, which may reduce a rotational speed of the LP spool 26 and, consequently, affect the HP spool 28 loading, which may need to burn additional fuel to maintain its sub-idle targeted speed.

Referring now to FIG. 3A, a proposed implementation to limit wind milling of the LP compressor 12 is shown and described below. In the embodiment shown, a gaspath valve 50 communicates with a main gaspath of the turboshaft engine 10. The gaspath valve 50 is operable to selectively open or close the main gaspath to limit an air flow F1 from flowing through the gaspath via the gaspath valve 50. The gaspath valve 50 may be located upstream of the LP compressor 12 and upstream of the HP compressor 14. In some other embodiments, the gaspath valve 50 may be located downstream of the LP compressor 12.

The gaspath valve 50 has a first open configuration in which the air flow F1 may flow through the gaspath valve 50 and a first closed configuration in which the gaspath valve 50 substantially limits or blocks the air flow F1 from flowing through the gaspath valve 50. The gaspath valve 50 may be a shutter or any other suitable device. In the embodiment shown, the gaspath valve 50 is formed by the variable guide vanes (VGGs) 36 located upstream of the LP compressor 12 that are pivotable about respective spanwise axes S between one or more open positions and a closed position. The VGVs 36 are shown in their open positions with a solid line and in their closed positions with a dashed line. It will be appreciated that the VGVs 36 need not extend in a radial direction relative to the central axis 30 and that that they may extend in a substantially axial direction relative to the central axis 30. In such a case, the air flow flowing between the VGVs 36 would have a radial component relative to the central axis 30. In the closed position, the guide vanes 36 substantially block the air flow F1 from flowing between the guide vanes 36. It will be appreciated that some minor leakage may occur. Alternately, the gaspath valve 50 may include a shutter or gates circumferentially distributed about the central axis 30 and being pivotable to selectively block or allow the air flow F1 through the gaspath valve 50.

Switching the gaspath valve 50, e.g. the VGVs 36, into the first closed configuration may limit the air flow F1 from reaching and from flowing through the LP compressor 12, which may limit the LP compressor 12 from wind milling. However, some air has to be fed to the HP compressor 14 to maintain combustion during the sub-idle or low power operation of the engine 10. To this end, a bypass flow path 52 extends around the LP compressor 12 and is used to feed a bypass flow F2 to the HP compressor 14 and downstream components. Hence, the bypass flow path 52 may feed air to the HP compressor 14 independently of the LP compressor 12. In other words, the air fed to the HP compressor 14 via the bypass flow path 52 bypasses the LP compressor 12. The bypass flow path 52 fluidly connects a source of air with the HP compressor 14 independently of the LP compressor 12.

The bypass flow path 52 has a bypass inlet 52A that communicates with a source of air, which corresponds herein to the gaspath at a location upstream of the LP compressor 12, and has a bypass outlet 52B that communicates with the gaspath downstream of the LP compressor 12 and upstream of the HP compressor 14. The bypass outlet 52B fluidly communicates with the bypass inlet 52A and with the gaspath at a location in the gaspath fluidly downstream of the gaspath valve 50. The bypass inlet 52A is located upstream of at least one stage of the LP compressor 12. In the embodiment shown, the bypass inlet 52A is located upstream of the LP compressor 12. In the present case, the bypass flow path 52 is a conduit extending outside the gaspath from the bypass inlet 52A to the bypass outlet 52B. The bypass inlet 52A may correspond to an inlet port defined through a wall 53 that delimits the gaspath. The bypass outlet 52B may correspond to an outlet port defined through the wall 53. These ports may be apertures defined through the wall 53. The wall 53 is herein a radially outer wall of the gaspath but may alternatively be a radially inner wall of the gaspath. The conduit of the bypass flow path 52 may include more than one conduit (e.g., 2 or more) circumferentially distributed around the central axis 30.

In the embodiment shown, a bypass valve 54 is communicating with the bypass flow path 52 and has a second open configuration and a second closed configuration to selectively open or close the bypass flow path 52. The bypass valve 54 is in the second open configuration when the gaspath valve 50 is in the closed configuration to feed the air flow F1 to the HP compressor 14 while bypassing the LP compressor 12 such that the LP compressor 12 is substantially non-rotating. The bypass valve 54 is in the second closed configuration when the gaspath valve 50 is in the first open configuration to flow the air flow F1 through both of the LP compressor 12 and the HP compressor 14. In other words, the bypass valve 54 is in the second closed configuration when the air flow F1 through the gaspath valve 50 is allowed and is in the second open configuration when the air flow through the gaspath valve 50 is blocked such that the air flow flows into the HP compressor 14 via the bypass flow path 52 while bypassing the LP compressor 12 such that the LP compressor 12 is substantially non-rotating.

Figure 3B:
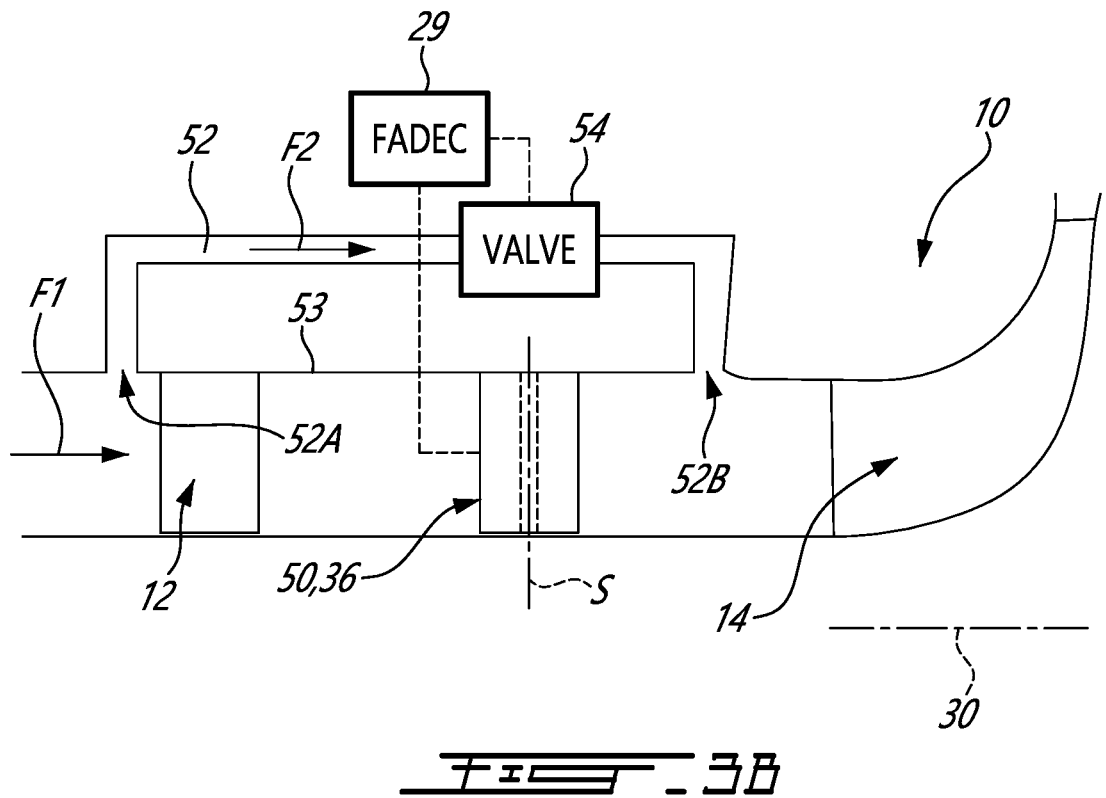
FIG. 3B is a schematic three dimensional view of a portion of the gas turbine engine of FIG. 1 showing the first exemplary implementation of the bypass around the low-pressure compressor of the engine of FIG. 1 in accordance with a second variant.

Referring now to FIG. 3B, an alternate variant of the configuration depicted in FIG. 3A is shown. In the present embodiment, the gaspath valve 50, which may correspond to the guide vanes 36, is located downstream of the LP compressor 12. The gaspath valve 50 may therefore be located between the LP compressor 12 and the HP compressor 14.

In use, when the gaspath valve 50 is in the first closed configuration and when the bypass valve is in the second open configuration, the air flow F1 may be diverted into the bypass flow path 52 without reaching the LP compressor 12. A portion of the gaspath downstream of the bypass inlet 52A of the bypass flow path 52 and upstream of the gaspath valve 50 may be seen as a dead cavity with limited air flowing in it when the gaspath valve 50 is closed. Hence, wind milling of the LP compressor 12 may be limited.

Figure 4A:
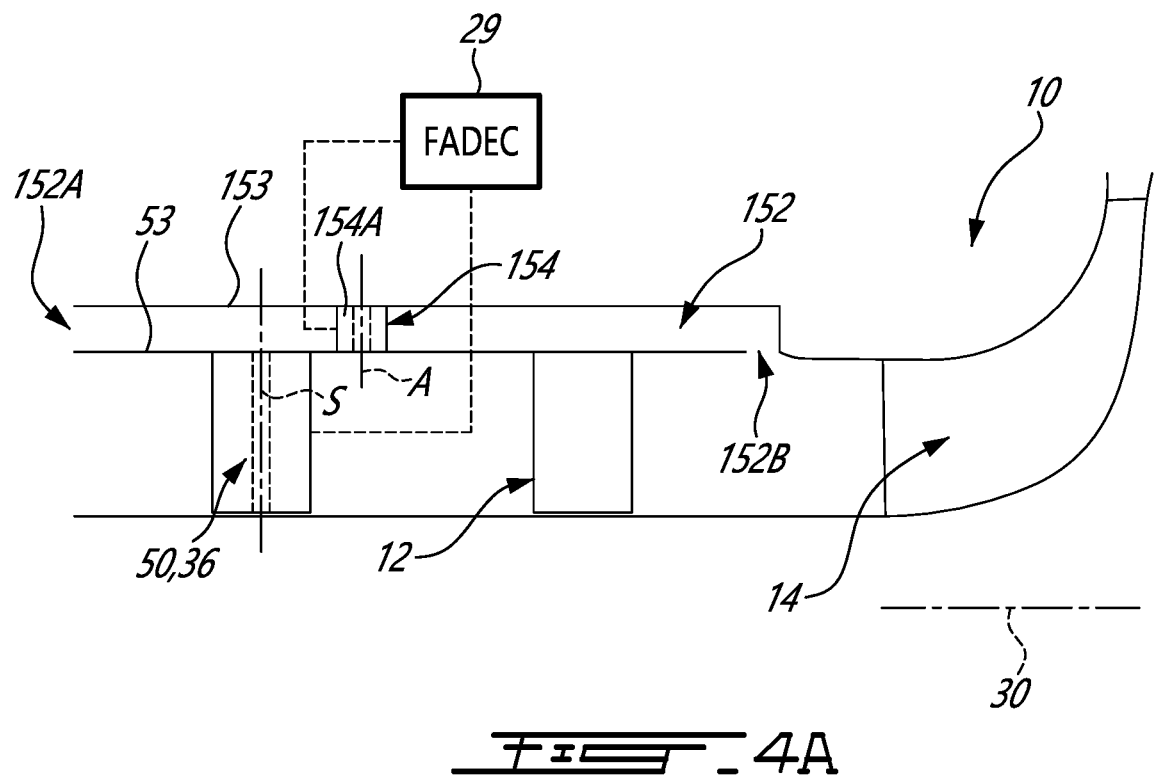
FIG. 4A is a schematic three dimensional view of a portion of the gas turbine engine of FIG. 1 showing a second exemplary implementation of a bypass around the low-pressure compressor of the engine of FIG. 1 in accordance with a first variant.

Referring now to FIG. 4A, another implementation of a bypass flow path is shown and described below. In the present embodiment, the bypass flow path 152 is annular and concentric with the gaspath. It may be located radially outwardly of the gaspath. In some other embodiments, it may be located radially inwardly of the gaspath. The bypass flow path 152 may be located radially between a wall 53 that delimits the gaspath and a secondary wall 153 that extends circumferentially around the wall 153 to define an annular conduit. The bypass flow path 152 need not be annular and may include a plurality of circumferentially distributed conduits.

In the embodiment shown, the bypass flow path 152 has an inlet 152A that is distinct and independent from an inlet of the gaspath. That is, air may flow in the bypass flow path 152 without having to flow first in the gaspath. The outlet 152B of the bypass flow path 152 may be a port defined through the wall 53 that delimits the gaspath in one embodiment or may be a dedicated secondary inlet of the HP compressor 14. The outlet 152B may be located upstream of the HP compressor 14 and downstream of the LP compressor 12. In the present case, the outlet 152B is located downstream of the VGVs 36. The gaspath valve 50, which may correspond to the guide vanes 36, may be located upstream of the LP compressor 12.

In the present case, the bypass valve 154 includes a plurality of pivotable gates 154A that are pivotable about respective axes A to selectively open or close the bypass flow path 152. The gates 154A are shown in their open position with a solid line and in their closed position with a dashed line.

Figure 4B:
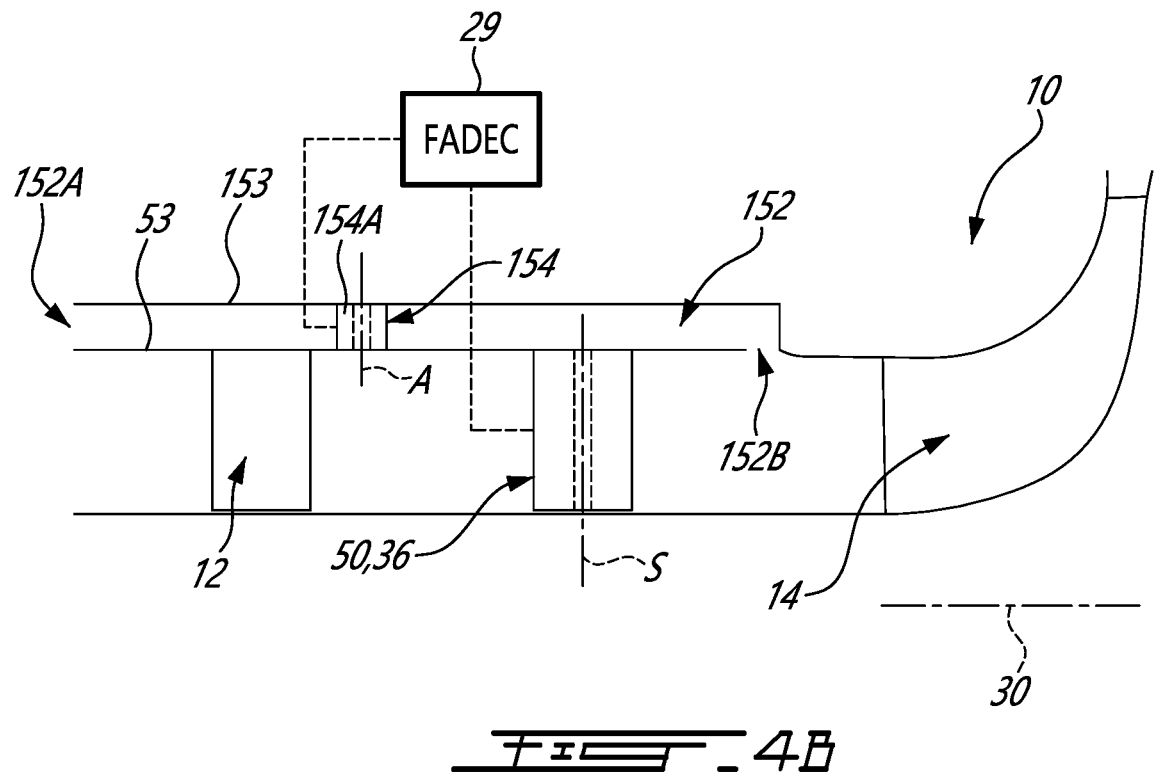
FIG. 4B is a schematic three dimensional view of a portion of the gas turbine engine of FIG. 1 showing the second exemplary implementation of the bypass around the low-pressure compressor of the engine of FIG. 1 in accordance with a second variant.

Referring now to FIG. 4B, an alternate variant of the configuration depicted in FIG. 4A is shown. In the present embodiment, the gaspath valve 50, which may correspond to the guide vanes 36, is located downstream of the LP compressor 12. The gaspath valve 50 may therefore be located between the LP compressor 12 and the HP compressor 14.

In use, when the gaspath valve 50 is in the first closed configuration and when the bypass valve 154 is in the second open configuration, the air flow F1 may be diverted into the bypass flow path 152 without reaching the LP compressor 12. A portion of the gaspath upstream of the gaspath valve 50 and comprising the LP compressor 12 may be seen as a dead cavity with limited air flowing in it when the gaspath valve 50 is closed. Hence, wind milling of the LP compressor 12 may be limited. It will be appreciated that the LP compressor 12 may still rotate because it is driven by the LP turbine 20 as shown in FIG. 2. However, because no air reaches the LP compressor 12, the latter may stall and become easier to rotate since less drag is generated on its airfoils.

Referring to FIGS. 3A to 4B, the gaspath valve 50 and the bypass valve 54, 154 may be operatively connected to the controller 29 to operate the closing and the opening of said valves. Referring to FIG. 5, a method of operating the engine 10 is shown at 500. The method 500 includes receiving a power demand at 502. The power demand may come from a power level of the rotorcraft. The method 500 includes determining that the power demand is below a power threshold such that the engine 10, which may be one of the two engines 10A, 10B, is to be operated in a low-power mode at 504. And includes feeding the air flow to the HP compressor 14 while bypassing the LP compressor 12 such that the LP compressor 12 remains substantially at rest and does not rotate at 506. In the embodiment shown, the feeding of the air flow includes flowing the air flow into the bypass flow path 52, 152 bypassing the LP compressor 12. In the embodiment shown, upon the receiving of the power demand being below the power threshold, the gaspath valve may be closed and the bypass valve may be opened such that the air flow F1 flows from the source of air to the HP compressor 14 while bypassing the LP compressor 14.

The method may include receiving a second power demand being above a second power threshold, and flow the air flow through both of the LP compressor 12 and the HP compressor 14 to operate the engine 10 in a higher power mode.

With reference to FIG. 6, an example of a computing device 600 is illustrated. For simplicity only one computing device 600 is shown but the system may include more computing devices 600 operable to exchange data. The computing devices 600 may be the same or different types of devices. The controller 29 may be implemented with one or more computing devices 600. Note that the controller 29 can be implemented as part of a full-authority digital engine controls (FADEC) or other similar device, including electronic engine control (EEC), engine control unit (ECU), electronic propeller control, propeller control unit, and the like. In some embodiments, the controller 29 is implemented as a Flight Data Acquisition Storage and Transmission system, such as a FAST™ system. The controller X may be implemented in part in the FAST™ system and in part in the EEC. Other embodiments may also apply.

The computing device 600 comprises a processing unit 602 and a memory 604 which has stored therein computer-executable instructions 606. The processing unit 602 may comprise any suitable devices configured to implement the method 500 such that instructions 606, when executed by the computing device 600 or other programmable apparatus, may cause the functions/acts/steps performed as part of the method 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for operating the engine described herein may be implemented in a high level procedural or object oriented programming or scripting language, or a combination thereof, to communicate with or assist in the operation of a computer system, for example the computing device 600. Alternatively, the methods and systems for operating the engine may be implemented in assembly or machine language. The language may be a compiled or interpreted language. Program code for implementing the methods and systems for operating the engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the engine may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
a low-pressure compressor and a high-pressure compressor located fluidly downstream of the low-pressure compressor relative to a gaspath extending through the aircraft engine;
a gaspath valve at a location in the gaspath fluidly upstream of the high-pressure compressor, the gaspath valve movable between an open configuration in which the gaspath valve allows a gas flow through the gaspath, and a closed configuration in which the gaspath valve blocks the gas flow through the gaspath;
a bypass flow path having in flow series a bypass inlet, a bypass valve, and a bypass outlet,
the bypass inlet fluidly communicating with the gaspath at a location in the gaspath fluidly upstream of at least one stage of the low-pressure compressor,
the bypass valve having an open configuration in which the bypass valve allows a bypass flow through the bypass flow path and a closed configuration in which the bypass valve blocks the bypass flow through the bypass flow path,
the bypass outlet fluidly communicating with the bypass inlet via the bypass valve and with the gaspath at a location in the gaspath fluidly downstream of the gaspath valve, downstream of the low-pressure compressor, and upstream of the high-pressure compressor to flow the gas flow to the high-pressure compressor while bypassing the at least one stage of the low-pressure compressor; and
a controller configured for closing the gaspath valve and opening the bypass valve such that the gas flow flows in the high-pressure compressor while bypassing the low-pressure compressor when a power demand of the aircraft engine is below a given threshold.

2. The aircraft engine of claim 1, wherein the gaspath valve is variable guide vanes extending across the gaspath and being pivotable about respective spanwise axes between an open position and a closed position.

3. The aircraft engine of claim 1, wherein the bypass inlet is an inlet port defined through a wall delimiting the gaspath, the bypass outlet being an outlet port defined through the wall delimiting the gaspath.

4. The aircraft engine of claim 1, wherein the bypass flow path is one or both of annular and concentric with the gaspath, and located radially outwardly of the gaspath.

5. The aircraft engine of claim 4, wherein the aircraft engine includes a gas turbine engine.

6. The aircraft engine of claim 4, wherein the bypass valve includes a plurality of pivotable gates extending across the bypass flow path.

7. The aircraft engine of claim 4, wherein the bypass inlet is independent from an inlet of the gaspath.

8. The aircraft engine of claim 1, wherein the gaspath valve is located in the gaspath at a location that is one of: upstream and downstream of the low-pressure compressor.

9. A multi-engine system for a rotorcraft, comprising:
a first turboshaft engine and a second turboshaft engine for driving a common rotatable load, the first turboshaft engine having:

a low-pressure compressor and a high-pressure compressor fluidly downstream of the low-pressure compressor relative to a gaspath extending through the first turboshaft engine, a gaspath valve at a location in the gaspath fluidly upstream of the high-pressure compressor, the gaspath valve movable between an open configuration in which the gaspath valve allows a gas flow through the gaspath, and a closed configuration in which the gaspath valve blocks the gas flow through the gaspath, a bypass flow path having in flow series a bypass inlet, a bypass valve, and a bypass outlet, the bypass inlet fluidly communicating with the gaspath at a location in the gaspath fluidly upstream of at least one stage of the low-pressure compressor, the bypass valve having an open configuration in which the bypass valve allows a bypass flow through the bypass flow path independently of the low-pressure compressor, and a closed configuration in which the bypass valve blocks the bypass flow through the bypass flow path, the bypass outlet fluidly communicating with the bypass inlet via the bypass valve and with the gaspath at a location in the gaspath fluidly downstream of the gaspath valve, downstream of the low-pressure compressor, and upstream of the high-pressure compressor to flow the gas flow to the high-pressure compressor while bypassing the at least one stage of the low-pressure compressor, and a controller having a processing unit and a computer-readable medium having instructions stored thereon executable by the processing unit for:

receiving a power demand;

determining that the power demand is below a power threshold such that the first turboshaft engine is to be operated in a low-power mode; and closing the gaspath valve and opening the bypass valve such that the gas flow flows in the high-pressure compressor while bypassing the low-pressure compressor.

10. The multi-engine system of claim 9, wherein the gaspath valve is variable guide vanes extending across the gaspath and being pivotable about respective spanwise axes between an open position and a closed position.

11. The multi-engine system of claim 9, wherein the bypass inlet of the bypass flow path is an inlet port defined through a wall delimiting the gaspath, the bypass outlet of the bypass flow path being an outlet port defined through the wall delimiting the gaspath.

12. The multi-engine system of claim 9, wherein the bypass flow path is one or both of annular and concentric with the gaspath.

13. The multi-engine system of claim 12, wherein the bypass flow path is located radially outwardly of the gaspath.

14. The multi-engine system of claim 12, wherein the bypass valve includes a plurality of pivotable gates extending across the bypass flow path.

15. The multi-engine system of claim 14, wherein the bypass inlet of the bypass flow path is independent from an inlet of the gaspath.

16. The multi-engine system of claim 9, wherein the gaspath valve is located in the gaspath at a location that is one of: upstream or downstream of the low-pressure compressor.

17. A method of operating a multi-engine system of a rotorcraft, the multi-engine system having a first turboshaft engine and a second turboshaft engine, the first turboshaft engine having a low-pressure compressor and a high-pressure compressor, the method comprising:

receiving a power demand;

determining that the power demand is below a power threshold such that the first turboshaft engine is to be operated in a low-power mode; and feeding an air flow to the high-pressure compressor of the first turboshaft engine while bypassing the low-pressure compressor thereof such that the low-pressure compressor remains substantially at rest during operation of the first turboshaft engine in the low-power mode.

18. The method of claim 17, wherein the feeding of the air flow includes flowing the air flow into a bypass flow path bypassing the low-pressure compressor.

19. The method of claim 17, comprising receiving a second power demand above a second power threshold and flow the air flow through both of the low-pressure compressor and the high-pressure compressor.

* * * * *